United States Patent
Samuels

(10) Patent No.: US 9,287,690 B2
(45) Date of Patent: Mar. 15, 2016

(54) GLASS FACEPLATE FOR KEYPAD OF A LOAD CONTROL SYSTEM

(71) Applicant: Lutron Electronics Co., Inc., Coopersburg, PA (US)

(72) Inventor: Richard David Samuels, Riegelsville, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 161 days.

(21) Appl. No.: 13/826,086

(22) Filed: Mar. 14, 2013

(65) Prior Publication Data

US 2014/0268630 A1  Sep. 18, 2014

(51) Int. Cl.

| | |
|---|---|
| *F21V 15/00* | (2015.01) |
| *H02G 3/08* | (2006.01) |
| *H02G 3/14* | (2006.01) |
| *H01H 13/7057* | (2006.01) |
| *H01H 13/86* | (2006.01) |
| *F21V 15/01* | (2006.01) |
| *F21V 15/04* | (2006.01) |
| *F21V 21/26* | (2006.01) |
| *F21V 21/28* | (2006.01) |
| *F21V 21/29* | (2006.01) |
| *F21V 21/30* | (2006.01) |
| *E05B 9/00* | (2006.01) |

(52) U.S. Cl.
CPC ........... *H02G 3/083* (2013.01); *H01H 13/7057* (2013.01); *H01H 13/86* (2013.01); *H02G 3/14* (2013.01); *E05B 9/002* (2013.01); *F21V 15/01* (2013.01); *F21V 15/012* (2013.01); *F21V 15/04* (2013.01); *F21V 21/26* (2013.01); *F21V 21/28* (2013.01); *F21V 21/29* (2013.01); *F21V 21/30* (2013.01); *H01H 2223/0345* (2013.01); *H01H 2223/056* (2013.01); *H01H 2231/012* (2013.01); *H01H 2300/03* (2013.01)

(58) Field of Classification Search
CPC ... F21S 48/12; F21S 48/1208; F21S 48/1225; F21S 48/1715; F21S 48/1721; F21S 48/1726; G09F 7/18; G09F 2007/00; H01L 23/051; F21V 15/01; F21V 15/012; F21V 15/04; E05B 9/002
USPC .................. 362/95, 362, 23.01, 23.02, 23.03; 174/66, 67; 220/241, 242, 3.3, 3.8, 220/259.1, 259.2
See application file for complete search history.

(56) References Cited

U.S. PATENT DOCUMENTS

| | | | |
|---|---|---|---|
| 3,953,933 A | * | 5/1976 | Goldstein .................. 40/642.02 |
| 4,803,380 A | | 2/1989 | Jacoby, Jr. et al. |
| 4,835,343 A | | 5/1989 | Graef et al. |

(Continued)

OTHER PUBLICATIONS

INNCOM GS-700 Family Glass Series Switches Sell Sheet dated Nov. 2008.

*Primary Examiner* — Evan Dzierzynski
*Assistant Examiner* — Zheng Song
(74) *Attorney, Agent, or Firm* — Ostrolenk Faber LLP

(57) ABSTRACT

A glass faceplate is cemented to a plastic carrier which can be removably connected to the adapter plate of a wall box dimmer. The glass plate is a flat tempered glass which may be suitably colored or clear and has a thickness less than three millimeters. Two elastic tethers are connected at one end to the carrier plate and at the other end to the adapter plate to serve as a pivotal connection at the bottoms of the two plates and prevent the accidental fall and breakage of the glass faceplate.

21 Claims, 8 Drawing Sheets

(56) References Cited

U.S. PATENT DOCUMENTS

| | | | |
|---|---|---|---|
| 4,924,349 A | 5/1990 | Buehler et al. | |
| 4,979,634 A * | 12/1990 | Begley | 220/242 |
| 5,637,930 A | 6/1997 | Rowen et al. | |
| 5,675,125 A * | 10/1997 | Hollinger | 174/66 |
| 5,794,308 A * | 8/1998 | Rentsch et al. | 16/225 |
| 5,955,702 A * | 9/1999 | Grossman et al. | 174/66 |
| 6,901,779 B2 * | 6/2005 | Magee et al. | 70/63 |
| 7,071,414 B2 * | 7/2006 | Kim | 174/66 |
| 7,745,750 B2 | 6/2010 | Hewson et al. | |
| 7,796,057 B2 | 9/2010 | Swatsky et al. | |
| 8,077,058 B2 | 12/2011 | Swatsky et al. | |
| 2009/0126968 A1 * | 5/2009 | Glas | 174/66 |
| 2011/0012852 A1 * | 1/2011 | Takahashi | 345/173 |
| 2011/0261511 A1 * | 10/2011 | Alderson et al. | 361/679.01 |
| 2012/0095601 A1 | 4/2012 | Abraham et al. | |
| 2012/0145430 A1 * | 6/2012 | Roban | 174/66 |

* cited by examiner

GLASS FACEPLATE FOR KEYPAD OF A LOAD CONTROL SYSTEM

BACKGROUND OF THE INVENTION

1. Field of the Invention

The present invention relates to a faceplate for the keypad of a load control device for controlling the amount of power delivered to an electrical load from an AC power source and more particularly to a glass faceplate for a wall box mounted load control device.

2. Description of Related Art

Wall mounted controls such as dimmers and switches for lamp and fan loads are well known. Typical devices include architectural style controls made and sold by the assignee of the present invention under the trademarks NOVA® and VAREO®; designer style controls made and sold by the assignee of the present invention under the trademark MAESTRO®, DIVA®, SKYLARK®, traditional style controls made and sold by the assignee of this invention under the trademarks ARIADNI® and FAEDRA®; and whole-home controls under the trademark RADIORA made and sold by the assignee of the present invention; and numerous other similar wall box mounted controls.

A control with a key pad for a RADIORA system is shown in U.S. Pat. No. 7,796,057, which is assigned to the assignee of this application.

Each of these devices have manual controls such as sliders, switch buttons and keypads which are accessible through openings in a decorative and protective faceplate. These faceplates are thin plastic plates which are commonly removably connected to the body of the wall mounted control by a faceplate adapter structure.

The use of glass for a face plate is very desirable because of its aesthetic appeal but the fragility of glass and the difficulty of removably connecting it to the wall box, and the danger of its falling and breaking into sharp shards; required a glass so thick that it would not be flush with the wall in which it is mounted. Thus, there has been a long felt need for a structure that would permit the use of glass for the decorative and protective faceplate of a wall-mounted electrical control device.

SUMMARY OF THE INVENTION

In accordance with the invention, a thin, e.g. less than about 3-mil thick tempered glass is cemented or bonded or otherwise permanently connected to a plastic carrier which is in turn connected to a faceplate adapter which is conventionally secured to the wall box body. The carrier is further pivotably tethered to the faceplate adapter, as by one or more thin bands, preferably elastic, so that when the faceplate is removed from the wall box, the tether will prevent the accidental dropping of the faceplate, while permitting access to the wall box for mounting or maintenance. When the faceplate is remounted on the wall box, the tethers are arranged to lie flat along the sides and between the carrier and adapter.

The glass surface area bonded to the carrier may be clear or may be any selected color. The underlying carrier may also be decorated as with any color or design. Since the glass is tempered if it is dropped for any reason onto a hard surface, if fractured, it will fracture in small pieces without sharp edges. Further, by keeping the glass to a thickness less than 3 millimeters, the glass will not extend off the wall and will be flush with the wall and the control buttons which are accessible through slots in the glass. Such slots are preferably formed by machining.

BRIEF DESCRIPTION OF THE DRAWING(S)

Figure 1:
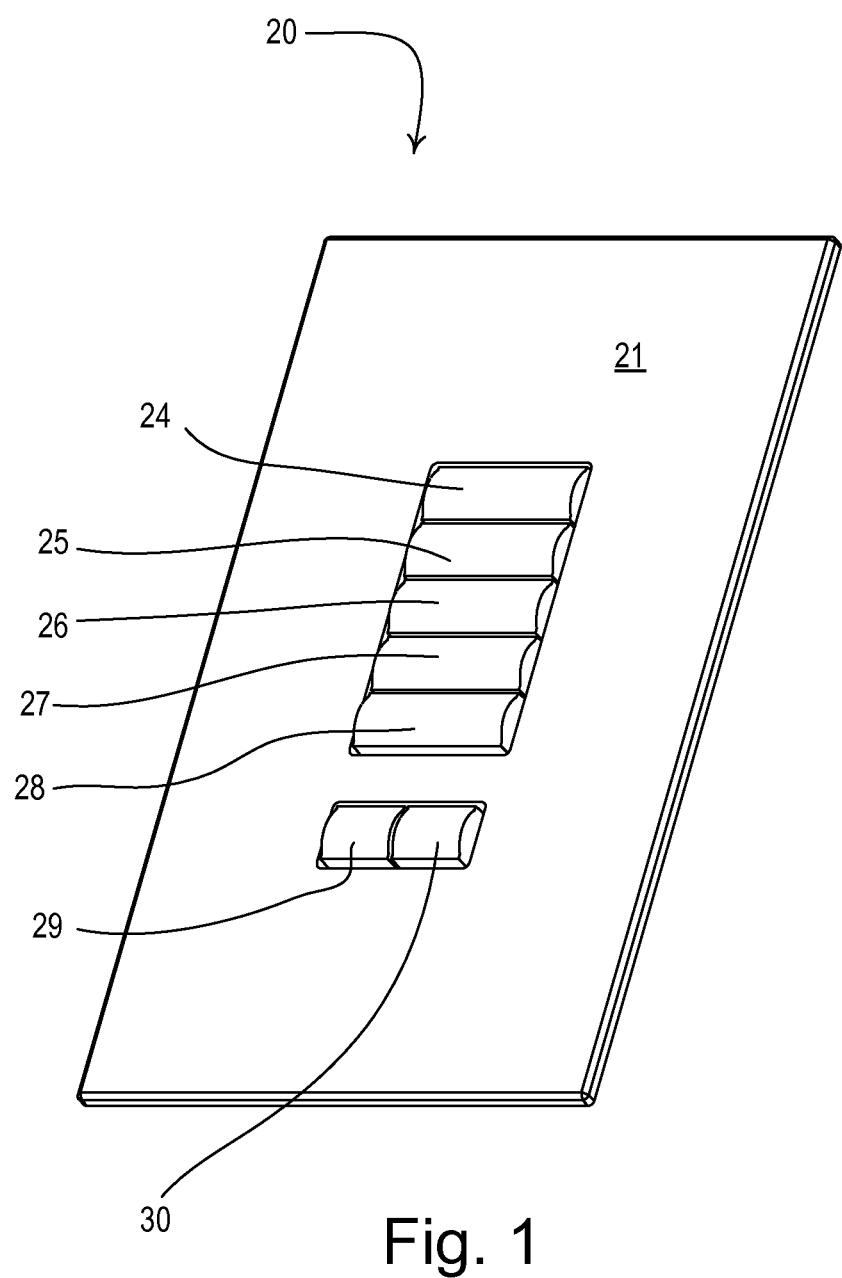
FIG. 1 is a perspective view of the front of a 5 scene keypad of a control which receives a glass faceplate.

Other features and advantages of the present invention will become apparent from the following description of the invention that refers to the accompanying drawings.

DETAILED DESCRIPTION OF EMBODIMENTS OF THE INVENTION

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
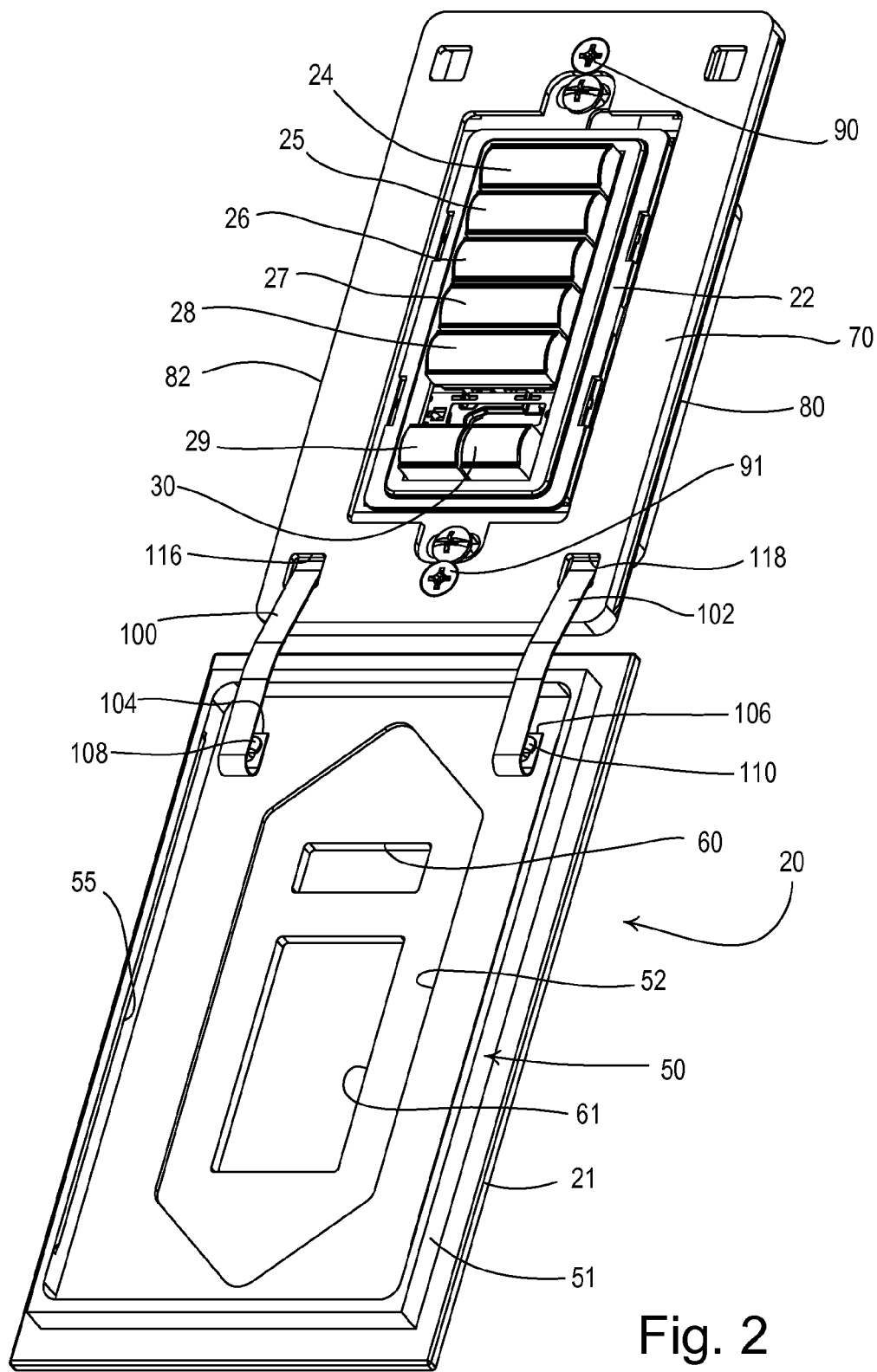
FIG. 2 is a perspective view of the faceplate of FIG. 1 with the faceplate and its carrier pivoted away from the adapter and of the securing elastic tethers connecting the carrier to the adapter.
Figure 3:
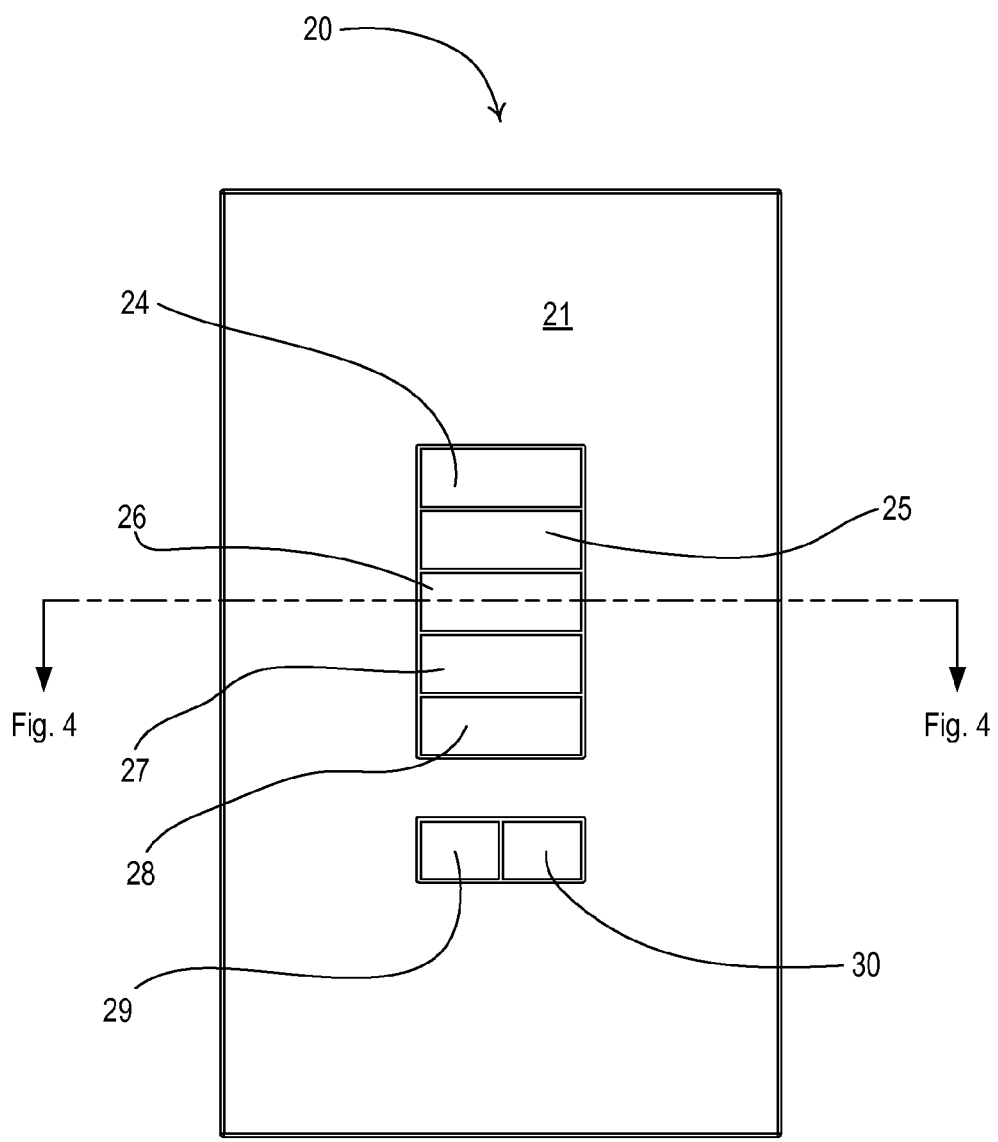
FIG. 3 is a front view of FIG. 1.

FIGS. 1 and 3 show the front of a wall box control device 20 having a rectangular (or square) faceplate 21. The wall box control device 20 comprises a keypad assembly 22 (FIG. 2) having five scene control buttons 24, 25, 26, 27, 28 and raise and lower buttons 29, 30. In accordance with the invention, the faceplate 21 may be made of tempered glass and may have a thickness less than about 3 mm. Alternatively, the faceplate 21 may have a thickness less than about 2.5 mm. The glass may be clear or colored, as desired and has openings 60, 61 machined therein (FIG. 2) to receive the scene control buttons 24-30.

The control device 20 has a wallbox base unit comprising a cradle 40 (shown in FIGS. 4, 6 and 7) and a rear enclosure (not shown) that may be connected to the rear of the cradle 40. The cradle 40 may receive a printed circuit board (not shown) on which the necessary electrical circuitry (not shown) for the control device 20 is mounted. When the rear enclosure is connected to the cradle 40, the printed circuit board and the electrical circuitry for the control device 20 are housed in the base unit. The buttons 24-28 operate switches (not shown) that are mounted to and extend from the printed circuit board in the wallbox base unit.

As shown in FIGS. 2 and 4-6, the glass faceplate 21 is cemented around a peripheral surface thereof to a molded plastic carrier plate 50. Other permanent connection devices can be used, including clamps, nuts and bolts and the like. The carrier plate 50 has a peripheral wall 51 and a central opening 52 (FIG. 2) to expose openings 60, 61 in the glass faceplate 21. The surface of the carrier plate 50 may be painted as desired.

The interior side edges of the carrier wall 51 contain ratchet extensions 54 and 55 (FIGS. 2 and 4), which enable the removable connection of the carrier plate 50 to an adapter plate 70 (FIGS. 2, 4, 5, 6, 7). The adapter plate 70 may be suitably secured to the cradle 40 as by screws 90, 91 (FIG. 2) or the like. The cradle 40 has extensions 71 and 72 that contain mounting screw openings, such as openings 73 and 74, respectively, which enable the mounting of control device 20 in an electrical wall box.

Figure 4:
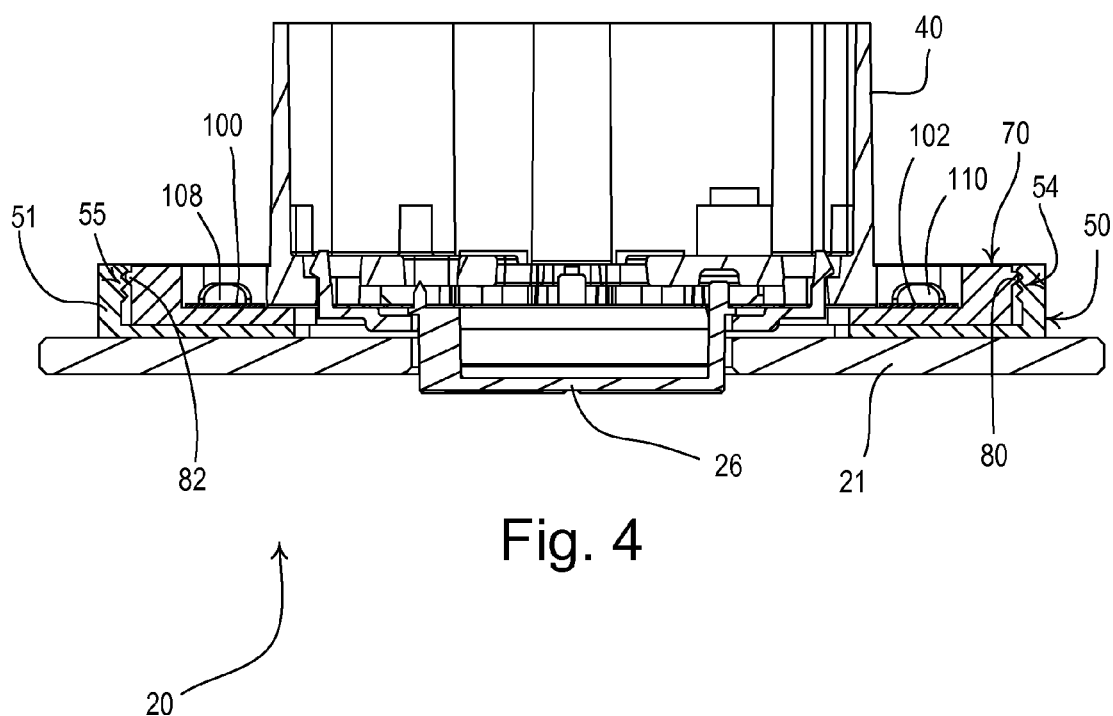
FIG. 4 is a cross-section of FIG. 3 taken across section line 4-4 in FIG. 3.

The adapter plate 70 also contains projections 80, 82, which extend from its peripheral edge. The projection 80 receives the cooperating ratchet extension 54 on carrier 50 and the projection 82 receives the ratchet extension 55 on carrier 50 to enable the nested and removable connection of the carrier 50 and the glass plate 21 to the adapter plate 70. As shown in FIG. 4, the adapter plate 70 may have a series of parallel ratchet extensions along its outer rim to enable the connection of the carrier 50 even if the wall or adapter plate is not perfectly flat as may occur if the glass faceplate 21 is wide enough to connect across two or more ganged wall boxes.

While the carrier wall 51 is shown as a continuous enclosed wall, the wall need not be continuous and only the side edges of the wall carrying the ratchets 54 and 55 are necessary. However, the full peripheral wall is useful in positioning the carrier plate 50 on the adapter plate 70.

The glass faceplate 21 may be back-lighted if desired to cause the faceplate to glow with an aesthetically-pleasing appearance. The glass faceplate 21 may be illuminated by a light source 150, for example, one or more LEDs (not shown) in the wall box unit and one or more light pipes 152 conducting the light from the LEDs to the rear surface glass faceplate. For example, the rear surface of the glass faceplate 21 exposed by the central opening 52 of the carrier plate 50 could be illuminated. In addition, the edges of the openings 60, 61 of the glass faceplate 21 could be illuminated.

Figure 5:
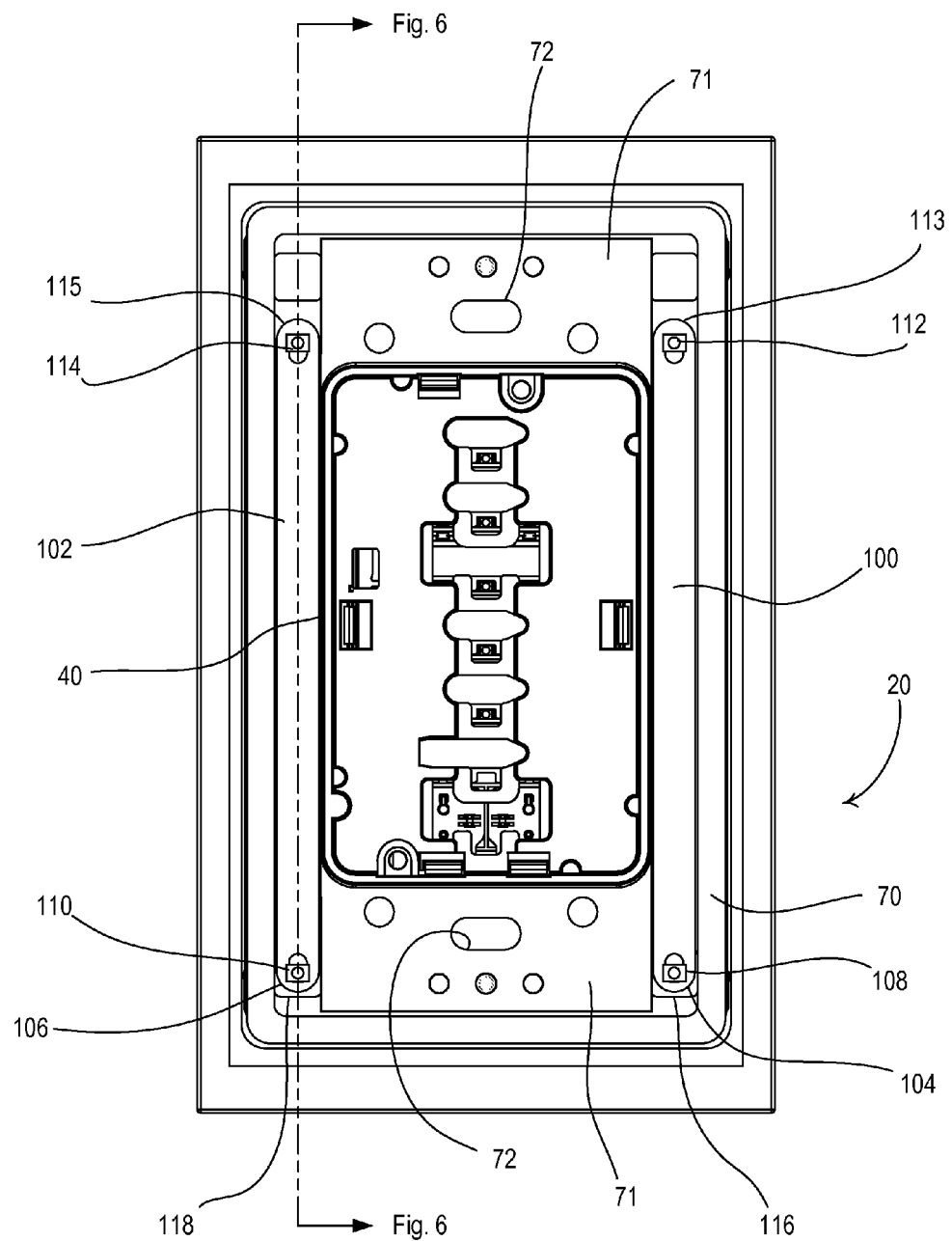
FIG. 5 is a front schematic view of the wall box and adapter plate with the faceplate and carrier of FIGS. 1-4 removed to show the elastic tethers attached to the adapter plate.

As a further feature of the invention, and to prevent possible breakage of glass faceplate 21 by a fall to the floor when opened to allow access to the interior of the keypad assembly 22 or the wall box circuits, the carrier 50 is pivotally connected to the adapter 70. In a preferred embodiment, the pivotal mounting is accomplished by two tethers 100, 102 (e.g., each about 2.5 centimeters wide). Each tether 100, 102 has one of their ends 104, 106 respectively connected to posts 108, 110, respectively, of carrier 50 (FIGS. 2, 4, 6, 7) and their other ends 113, 115 extending through openings 116 and 118, respectively, in the adapter plate 70 and connected to posts 112 and 114 of the adapter 70 (FIGS. 4, 5 and 7). The ends of the tethers 100, 102 may have slits or eyelets which receive their respective posts with a tight fit. The tethers 100 and 102 are preferably thin elastic bands. One or more tethers can be used.

Figure 6:
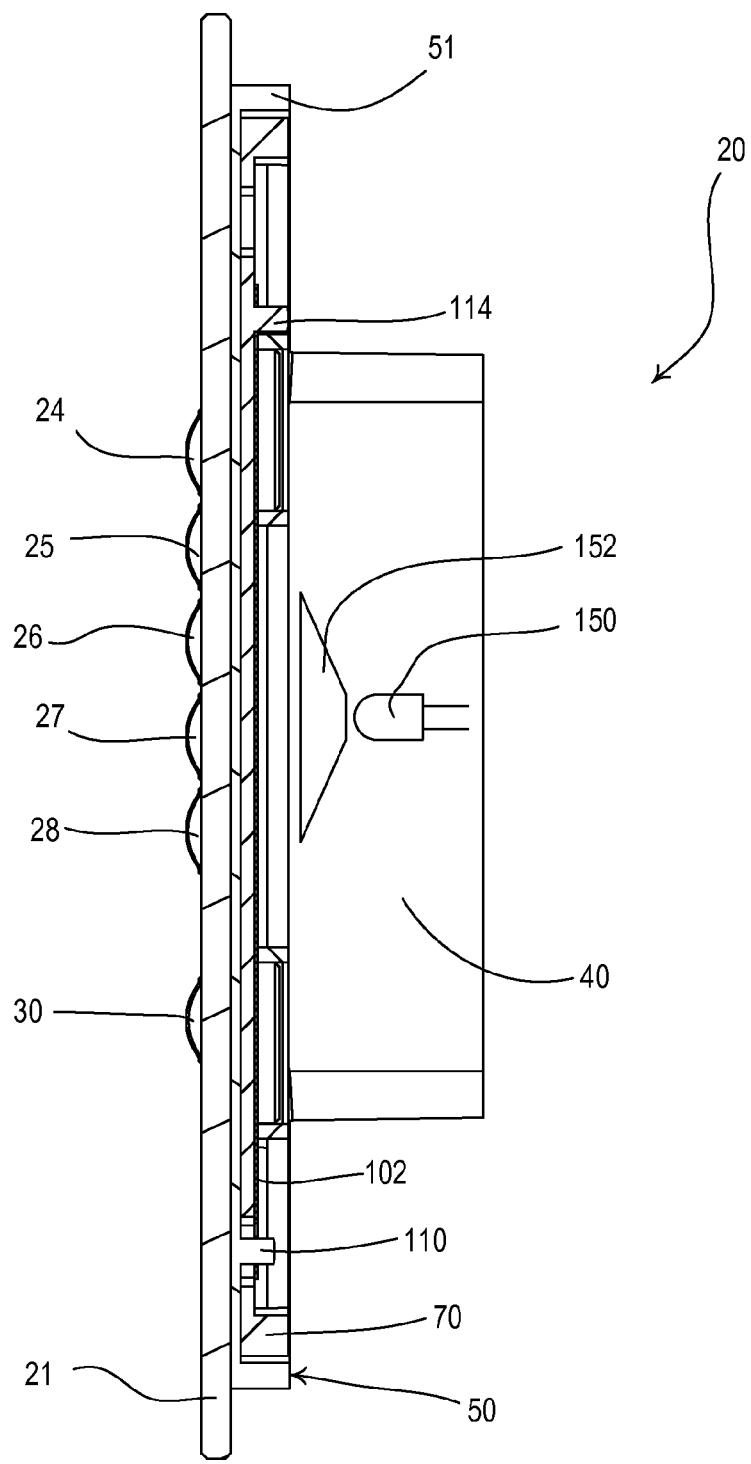
FIG. 6 is a cross-sectional view of FIG. 5 taken across section line 5-5 in FIG. 5.
Figure 7:
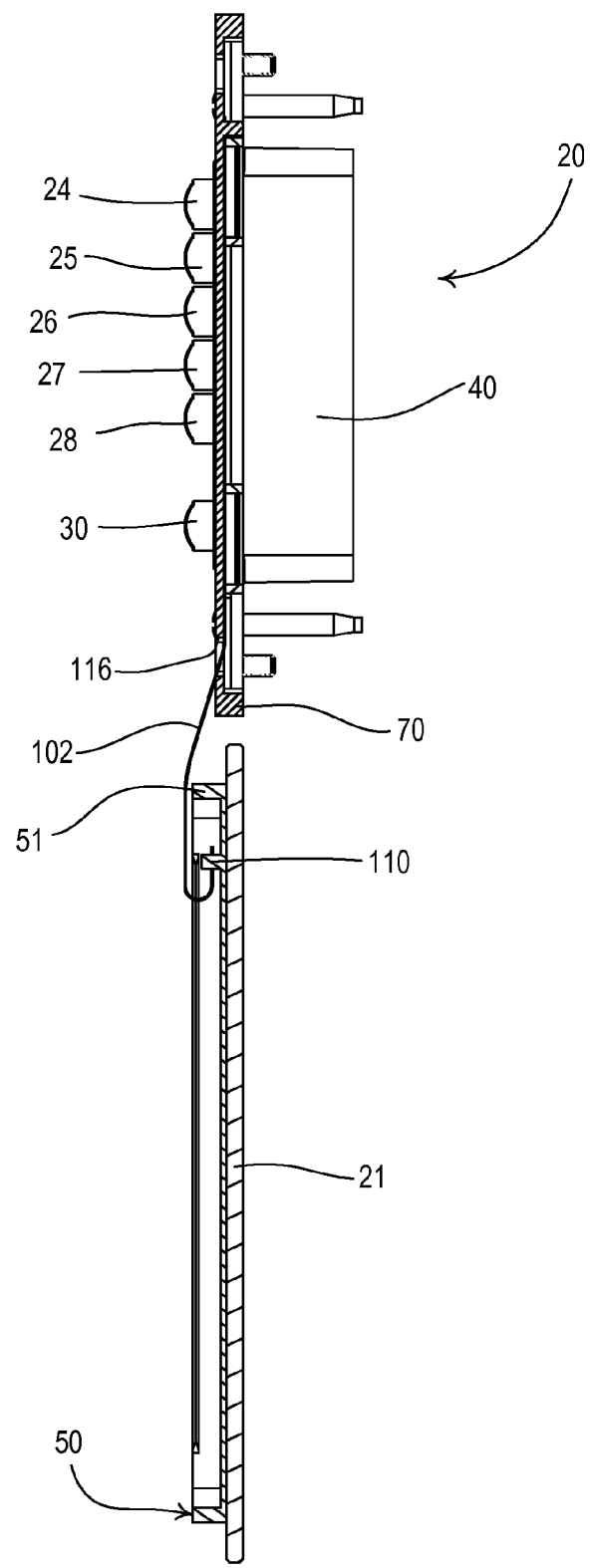
FIG. 7 is a view of FIG. 6 with the carrier and glass faceplate in a pivoted open position.

When the carrier 50 and glass faceplate 21 are rotated back from the open condition of FIGS. 2 and 7 to the closed position of FIGS. 1 and 6, the elastic tethers 100, 102 will lay flat and extended along the sides of and inside the wall 51 of the carrier (FIGS. 5 and 6) and will not bunch up to prevent closure of the carrier 50 onto the adapter 70.

While the pivotal connection of the carrier 50 to the adapter 70 has been made with elastic tethers 100 and 102, the pivotal connection can be made with other instrumentalities such as a pivot, a living hinge, or the like.

Figure 8:
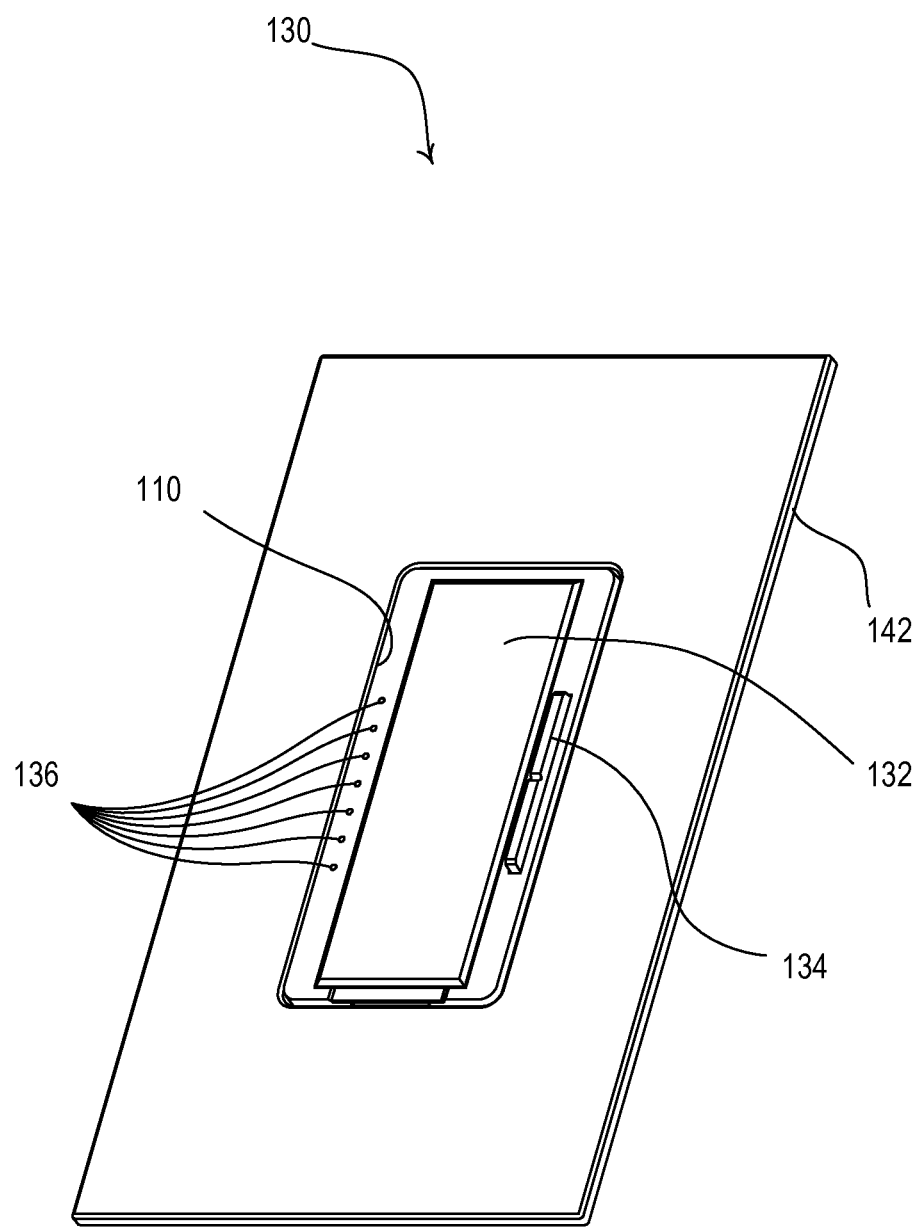
FIG. 8 is a perspective view of a control employing the glass faceplate and carrier of the invention for a control with a different set of ON/OFF and dimmer controls.

While the invention has been described in connection with a wall box control having a five scene key pad, the invention can be applied to any wall box control having a faceplate. Thus, the invention can be used for a dimmer switch 130 of FIG. 8 which has an ON/OFF paddle switch 132, a dimmer rocker switch 134 and visual indicators 136, e.g., light-emitting diodes (LEDs), made accessible through window 138 in a glass faceplate 140. The glass faceplate 140 can be constructed as shown and described in FIGS. 1-7 to consist of a glass faceplate carried on a carrier which is pivotally connected to a wall box adapter plate to prevent its accidental dropping.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A glass faceplate assembly for a wall box control device, said glass faceplate assembly comprising:
   a flat glass plate having at least one opening therein for receiving at least one control button and a plastic carrier plate attached to said flat glass plate for supporting said flat glass plate and having at least one opening therein aligned with the at least one opening in the flat glass plate;
   an adapter plate, said carrier plate being removably attached to said adapter plate, the adapter plate configured to be fastened to a base of the wall box control device; and
   a tethering connector connecting said carrier plate and said adapter plate, whereby said carrier plate is safely secured to said adapter plate by said tethering connector when said carrier plate is moved away from said adapter plate to expose said adapter plate;
   said carrier plate having a releasable fastener for allowing said carrier plate to be attached to and detached from said adapter plate; and
   wherein said carrier plate contains a peripheral wall around at least a portion of a periphery of said carrier plate and an edge surface around a periphery of said adapter plate which is dimensioned to nest with respect to said wall of said carrier plate when said carrier plate is mounted to said adapter plate.

2. The assembly of claim 1, wherein said flat glass plate is cemented at its peripheral surface to an opposing peripheral surface of said carrier plate.

3. The assembly of claim 2, wherein said flat glass plate is of tempered glass.

4. The assembly of claim 3, wherein said flat glass plate has a thickness less than about 3 mm.

5. The assembly of claim 2, wherein said flat glass plate has a thickness less than about 3 mm.

6. The assembly of claim 1, wherein said flat glass plate is of tempered glass.

7. The assembly of claim 1, wherein said flat glass plate has a thickness less than about 3 mm.

8. The assembly of claim 1, wherein said tethering connector comprises a pivotal connector connecting one edge of said carrier plate to a corresponding edge of said adapter plate, whereby said carrier plate is safely secured to said adapter plate when said carrier plate is rotated away from said adapter plate to expose said adapter plate.

9. The assembly of claim 8, wherein said pivotal connector comprises at least one elastic tether connected between said carrier plate and said adapter plate.

10. The assembly of claim 9, wherein one end of said at least one tether is connected to a surface of said carrier plate which faces said adapter plate and the other end of said at least one tether is connected to a surface of said adapter plate which faces away from said carrier plate.

11. The assembly of claim 1, wherein said releasable fastener comprises ratchet teeth in said wall of said carrier plate and said adapter plate comprises a projection in said edge of said adapter plate which removably engages said ratchet teeth when said wall and edge are nested together.

12. A glass faceplate assembly for a wall box control device, said glass faceplate assembly comprising:
   a flat glass plate having at least one opening therein for receiving at least one control button and a plastic carrier plate attached to said flat glass plate for supporting said flat glass plate and having at least one opening therein aligned with the at least one opening in the flat glass plate;
   an adapter plate, said carrier plate being removably attached to said adapter plate, the adapter plate configured to be fastened to the wall box control device; and
   a tethering connector connecting said carrier plate and said adapter plate, whereby said carrier plate is safely secured to said adapter plate by said tethering connector when said carrier plate is moved away from said adapter plate to expose said adapter plate;
   said carrier plate having a releasable fastener for allowing said carrier plate to be attached to and detached from said adapter plate, and
   wherein said tethering connector comprises a pair of parallel elastic tethers connected between said carrier plate and said adapter plate; said pair of parallel elastic tethers lying along opposite sides of said carrier plate when said carrier plate is attached to said adapter plate.

13. The assembly of claim 12, wherein one of the ends of said pair of tethers are connected to a surface of said carrier plate which faces said adapter plate and the other ends of said pair of tethers are connected to a surface of said adapter plate which faces away from said carrier plate.

14. The assembly of claim 13, wherein said flat glass plate is of tempered glass.

15. The assembly of claim 14, wherein said flat glass plate has a thickness less than about 3 mm.

16. The assembly of claim 13, wherein said flat glass plate is cemented at its peripheral surface to an opposing peripheral surface of said carrier plate.

17. The assembly of claim 13, wherein said flat glass plate has a thickness less than about 3 mm.

18. A glass faceplate assembly for a wall box control device, said glass faceplate assembly comprising:
   a flat glass plate having at least one opening therein for receiving at least one control button and a plastic carrier plate attached to said flat glass plate for supporting said flat glass plate and having at least one opening therein aligned with the at least one opening in the flat glass plate;
   an adapter plate, said carrier plate being removably attached to said adapter plate, the adapter plate configured to be fastened to the wall box control device; and
   a tethering connector connecting said carrier plate and said adapter plate, whereby said carrier plate is safely secured to said adapter plate by said tethering connector when said carrier plate is moved away from said adapter plate to expose said adapter plate;
   said carrier plate having a releasable fastener for allowing said carrier plate to be attached to and detached from said adapter plate, said carrier plate comprising a peripheral wall around at least a portion of a periphery of said carrier plate and an edge surface around a periphery of said adapter plate which is dimensioned to nest with respect to said wall of said carrier plate when said carrier plate is mounted to said adapter plate;
   wherein said releasable fastener comprises ratchet teeth in said wall of said carrier plate and said adapter plate comprises a projection in said edge of said adapter plate which removably engages said ratchet teeth when said wall and edge are nested together, there being a plurality of ratchet teeth in one of said walls of the carrier plate thereby permitting adjustment of the relative proximity of the carrier plate to the adapter plate.

19. The assembly of claim 18, wherein said pivotal connector comprises at least one elastic tether connected between said carrier plate and said adapter plate.

20. The assembly of claim 19, wherein said pivotal connector comprises a pair of parallel elastic tethers connected between said carrier plate and said adapter plate and lying along opposite sides of said carrier plate when said carrier plate is fixed to said adapter plate.

21. The assembly of claim 18, wherein said tethering connector comprises a pivotal connector connecting one edge of said carrier plate to a corresponding edge of said adapter plate, whereby said carrier plate is safely secured to said adapter plate when said carrier plate is rotated away from said adapter plate to expose said adapter plate.

* * * * *